W. M. RANK.
VEHICLE WHEEL.
APPLICATION FILED MAR. 20, 1911.
1,054,614.
Patented Feb. 25, 1913.
2 SHEETS—SHEET 1.
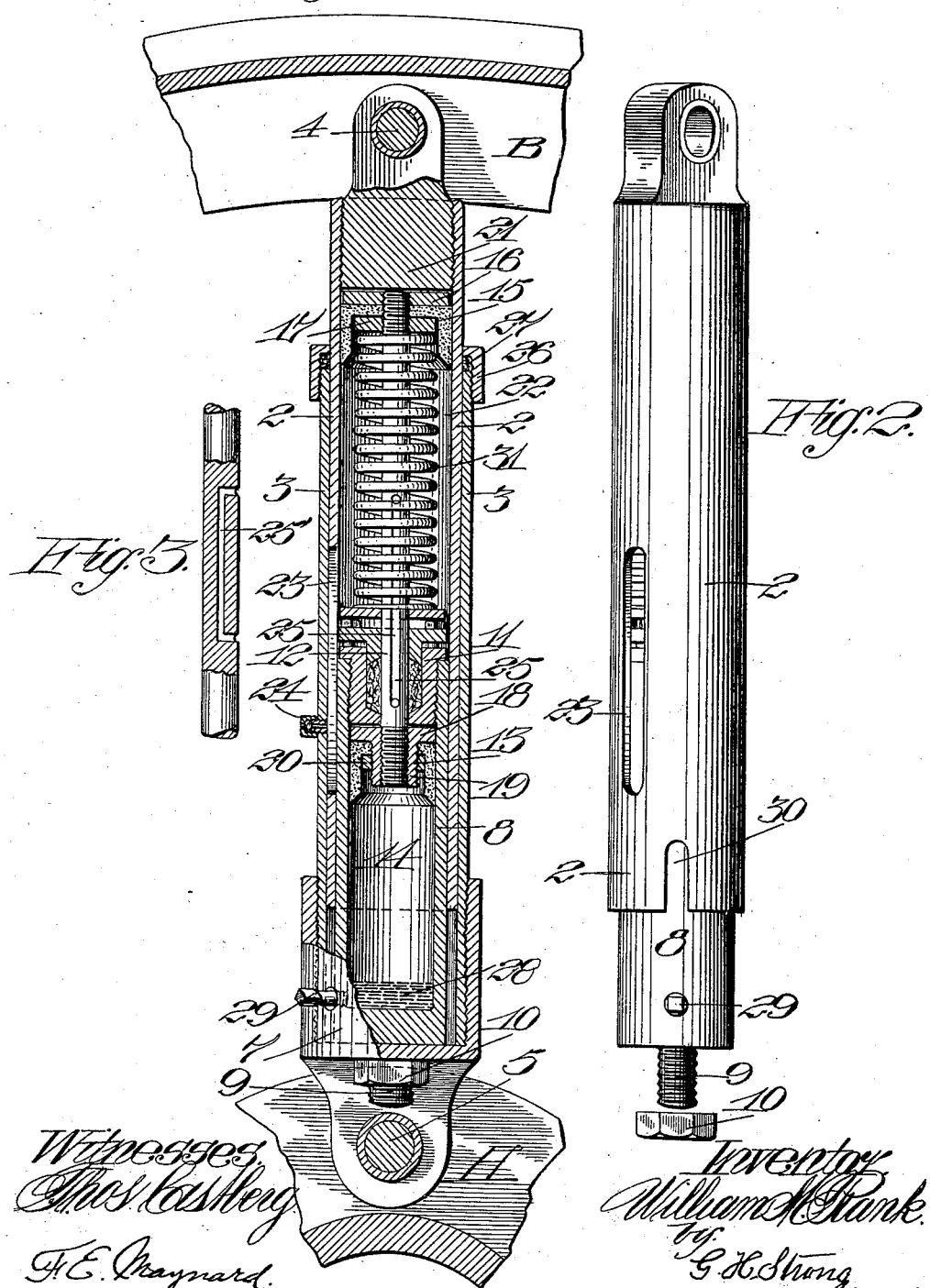

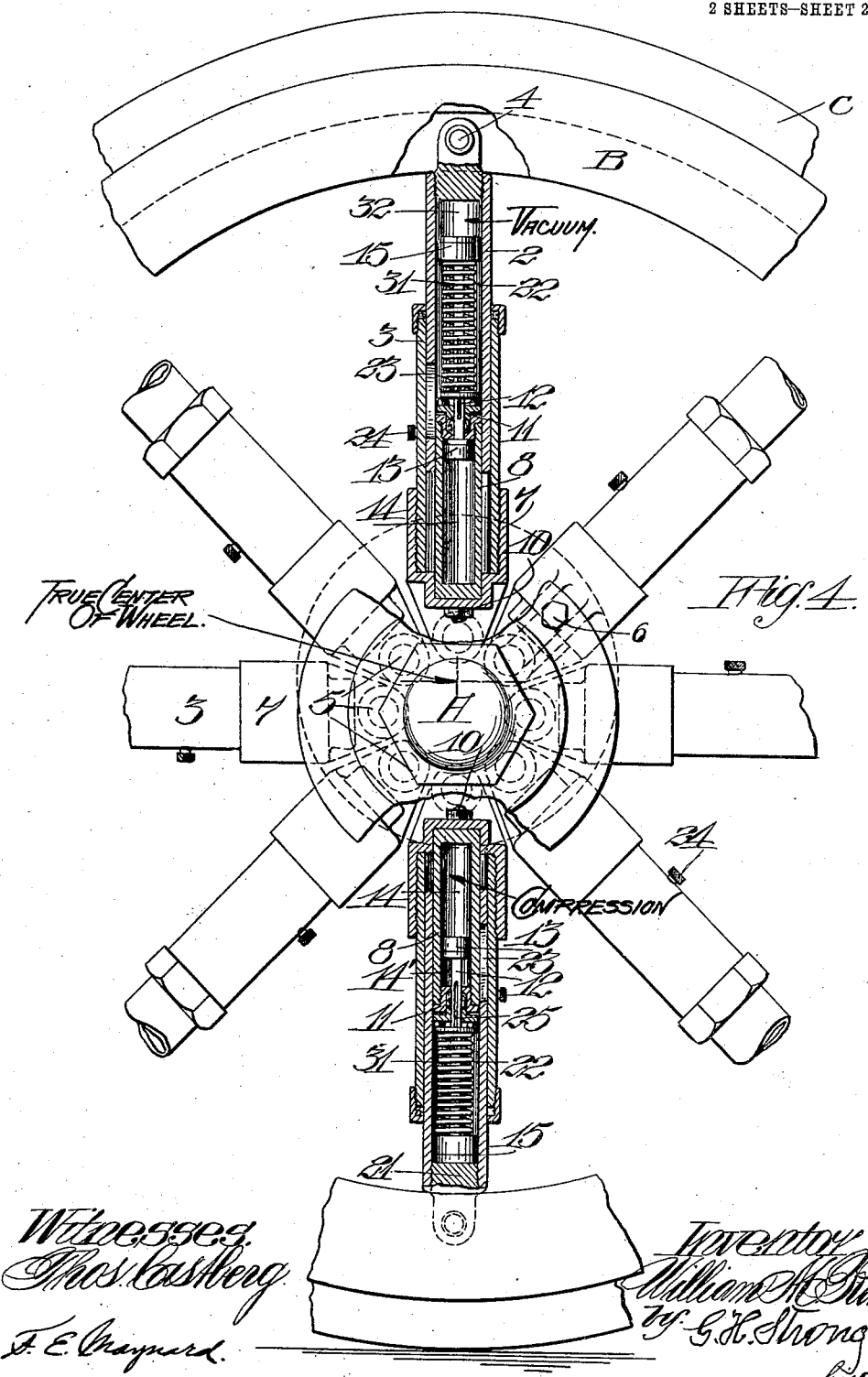

UNITED STATES PATENT OFFICE.

WILLIAM M. RANK, OF SAN FRANCISCO, CALIFORNIA, ASSIGNOR OF ONE-THIRD TO LUCIEN R. GRUSS, OF SAN FRANCISCO, CALIFORNIA.

VEHICLE-WHEEL.

1,054,614.  Specification of Letters Patent.  Patented Feb. 25, 1913.

Application filed March 20, 1911. Serial No. 615,507.

*To all whom it may concern:*

Be it known that I, WILLIAM M. RANK, citizen of the United States, residing in the city and county of San Francisco and State of California, have invented new and useful Improvements in Vehicle-Wheels, of which the following is a specification.

This invention relates to vehicle wheels, and particularly to cushion wheels employing a floating piston for automobiles and the like.

The object of my invention is to provide a simple, practical form of spoke construction in which a floating piston is employed in conjunction with telescoping cylindrical spoke sections, the particular object being to devise a valveless arrangement for automatically replenishing the compression chamber formed in the spoke, and also to devise means for predetermining the amount of cushion action ordinarily to be allowed a wheel so that the wheel and spokes may be constructed in accordance with the load to be carried.

The invention consists of the parts and the combination and construction of parts as hereinafter more fully described and claimed, having reference to the accompanying drawings, in which—

Figure 1 is a longitudinal section of a spoke with the piston and parts in normal position with the hub and rim of the wheel concentric. Fig. 2 is a perspective view of a spoke detached. Fig. 3 is a detail of the piston rod in partial section to show the port or air duct. Fig. 4 is a side elevation of a part of a wheel, with top and bottom opposed spokes in section, with the lowermost section operating on compression and the upper on vacuum.

A is a hub, and B represents the rim of my wheel, to which latter is applied the solid rubber tire or tread C.

The invention resides in the spoke construction. Each spoke is made in two telescoping sections 2 and 3, the outer section of each spoke being pivoted to the rim, as at 4, and the inner section of all the spokes, except one, being pivoted to the hub, as shown at 5. One spoke is secured to the hub by a lug or key 6, as shown in Fig. 4, for the purpose of giving traction. The inner section of each spoke 3 is secured to a suitable socket-piece 7. Secured concentrically within this socket-piece and rigidly connected thereto is a cylinder 8. As shown in Fig. 2, the cylinder 8 has a screw threaded projection 9 on its lower end adapted to pass through the bottom of the socket-piece 7 and to be rigidly secured thereto by a nut 10. This forms a simple, practical means for connecting the cylinder rigidly to the socket. The outer telescoping section 2 works in the space formed between the cylinder 8 and the outer tube 3.

The outer end of the cylinder 8 is closed by a gland 11, through which a piston rod 12 operates. The end of the piston rod 12 nearest the hub carries a piston 13, working in the chamber 14, formed in cylinder 8. This chamber 14 is a pneumatic cushion chamber, or compression chamber, as I term it. The outer end of the piston rod connects to a piston head 15, which has a snug sliding fit in the outer spoke section 2. Normally, with the wheel hub and rim concentric, as shown in Fig. 1, the pistons 15—13 will be at the end of their stroke and seated against the ends of the respective chambers. The construction of both of these pistons is important for the reason that each piston is designed to be perfectly air-tight when moved in one direction, and yet permit air to pass between it and the walls of its respective cylinder when moved in the opposite direction, as will be shortly explained.

The outer piston 15 is made up of a cup leather clamped between two metal disks 16—17, which screw on, or are otherwise secured to the end of the piston rod 12. The outer disk 16 is just a trifle smaller than the internal bore of the section 2, while the underneath disk 17 is just large enough to support the underside of the cup leather. This entire valve is collectively represented by the character 15. The inner or compression valve, the one nearest the hub, is of similar construction, except that the outer disk 18 is shown as having a threaded flange 19 screwing on to the inner end of the piston rod 12, with the smaller disk 20 screwing on to the threaded exterior of the flange 19 and clamping a cup leather between the two disks. The relative sizes of the clamping disks in each case are such that the leathers 15—13 may contract sufficiently when moving outwardly in their spoke sections to allow any air of higher pressure (on that side in the direction in which they are traveling) to pass by the leathers valve-fashion into the space or spaces behind the pistons and toward the hub. When the pistons move inwardly the cup leathers are designed to expand and tightly hug their cylinders so that no air can get by.

The outer piston 15 normally seats snug against the end 21 of its cylinder, and whenever it moves away from its seat 21 a vacuum is created which tends to draw this piston 15 back to its seat. The space 22 in the tube 2 on the side of the piston 15 nearest the hub is always in free communication with the outer atmosphere through a slot 23 formed in the tube 2, which slot opens out through a bleed port 24 formed in the outside section 3. The piston 15, in fact, acts on vacuum as a return check or auxiliary cushion to piston 14.

In order to admit air from time to time into the compression chamber 14 and automatically proportion the compression to the load carried, I form a longitudinal groove
25 25 in the valve stem 12 (or instead of forming a groove 25 on the surface of the piston rod, I may core out the piston rod to form a port 25′, as shown in Fig. 3; the two constructions being equivalent). The groove 25 is so positioned that its end nearest the piston 13 will, when the piston 13 is resting against the gland 11, be within the gland and cut off all air communication between the interior of the cylinder 8 and the outer atmosphere; also the distance that this inner end of the groove 25 is from the piston 13 will determine the limits within which no fresh air can be taken in to the cylinder 8.

In practice, the operation of the wheel is as follows: As the wheel revolves, each spoke, as it comes vertically beneath the hub, will assume more or less the position shown in Fig. 4, and the opposite spoke above the hub will assume substantially the position shown at the top of Fig. 4; the wheel hub dropping more or less and becoming accordingly more or less eccentric to the rim. The amount of eccentricity of the hub with respect to the rim, of course, determines the length of stroke of the pumping piston 13 and of the vacuum piston 15. It is to be borne in mind that normally with the hub concentric the two pistons 13—15 in every spoke rest against their respective seats 11—21. Therefore, it will be seen by reference to Fig. 4 that the piston 15 in the spoke below the hub will rest against its seat 21 and so rigidly support the piston rod 12, while the piston 13 will move up into its compression chamber 14 in the cylinder 8 a distance equal to the depression of the hub A below its normal center. This upward movement of piston 13 effects a compression of the air in chamber 14, since there is no outlet from chamber 14. If, when the wheel was first started, the air in all the chambers 14 was at, or only slightly above, atmosphere, of course the pistons 13 would move in quite a distance, this movement, however, lessening with each revolution of the wheel until, as practice shows, after a few revolutions the chambers 14 become pumped up and maintain their compression proportionately to the load carried. This pumping up of the compression chambers is accomplished in this manner:—As seen in the lower spoke, Fig. 4, the piston rod 12 has moved far enough through the gland 11 to expose the inner end of the groove 25 within the chamber 14, but, of course, on the underside of the piston 13. This brings a space 14′ in cylinder 8 into free communication with the outer atmosphere through the space 22, slot 23, and port 24, Fig. 1. As the wheel continues its revolution and approaches the position shown at the top of Fig. 4, the spoke lengthens, drawing the piston 13 back against the gland 11, and withdrawing groove 25 from communication with the space between the gland 11 and piston 13. The air which has thus been trapped in the space 14′ is forced to seek an outlet, which it does between the walls of the cylinder 8 and the flexible cup leather of the valve 13; this air escaping into the compression chamber 14. The outward movement of the piston 13 toward its seat against the gland 11 is facilitated by the spring 31 and the vacuum produced in the space 32 formed between the piston 15 and its seat 21. This pumping action of piston 13 proceeds for a few revolutions, as before stated, the stroke gradually growing less as the pressure in chamber 14 increases, until the compression in chamber 14 is enough to limit the movement of the piston 13 so that the groove 25 does not protrude through into the space 14′. Of course, in that case, the space 14′ becomes a vacuum chamber which coacts with the compression chamber 14 to sustain the weight of the vehicle. Whenever the air pressure in chamber 14 runs down beyond a point to allow the piston 13 to take a longer stroke, then more air is admitted by groove 25 into space 14′, and thence transferred past the cup leather to the piston 13 into the compression chamber 14.

For light vehicles desiring a considerable amount of spring, and easy motion, the end of the groove 25 will be farther away from the piston 13; with heavy vehicles requiring a strong compression in chambers 14, and in which the degree of cushion is not as great, then the end of the groove 25 is brought nearer to the piston 13. In other words, by this construction it is possible to regulate at the factory just the amount of cushion and spring that a particular wheel or vehicle is to have under ordinary running conditions.

In order to exclude any dust from entering into the interior of the spokes or coming between the telescoping sections, I provide an annular cap 26, which screws down over the end of the section 3, which is adapted to compress a packing 27 against the tube 2.

A considerable volume of oil, represented at 28, is maintained in the cylinder 14, being admitted through a suitable opening which is normally closed by the screw plug 29; the section 2, Fig. 2, being slotted as shown at 30, to accommodate the plug 29 when the sections 2—8 are made to telescope.

31 is a spring adapted to bear against the gland 11 and piston 15 and normally move the piston outwardly. This spring has nothing to do with effecting any cushioning action or sustaining any weight, but is merely auxiliary to the vacuum chamber 32 provided by the piston 15 in its chamber, and insures a quick, outward movement of the two pistons to their outermost limits. The piston rod 12, with its piston heads, is entirely disconnected from the hub and rim and from the spoke sections in which it moves, except for the free floating piston action maintained and arranged for within the spoke sections.

The chief point of novelty in the present combination is the grooved piston rod with the flexible cup leathers, whereby the automatic pumping action of the piston is controlled and the degree of cushion to be given a wheel determined.

Having thus described my invention, what I claim and desire to secure by Letters Patent, is—

1. In a vehicle wheel, the combination with a rim and hub, of a spoke composed of two telescoping cylinders, one of which is pivoted to the rim and the other pivoted to the hub, a floating piston disconnected from each cylinder and also from the hub and rim and having a head working in a compression chamber in one cylinder, a stuffing-box in the end of the cylinder, said piston having a rod extending through said stuffing box, and means for maintaining the head normally at one end of said chamber, said piston rod having a longitudinal groove constructed and arranged to bring the interior of the chamber and outer atmosphere into communication on alternate reciprocations of the piston.

2. In a vehicle wheel, the combination with a rim and hub, of a spoke composed of two telescoping cylinders, one of which is pivoted to the rim and the other pivoted to the hub, a floating piston disconnected from each cylinder and also from the hub and rim and having a head working in a compression chamber in one cylinder, a stuffing-box in the end of the cylinder, said piston having a rod extending through said stuffing box, and means for maintaining the head normally at one end of said chamber, said piston rod having a longitudinal groove constructed and arranged to bring the interior of the chamber and outer atmosphere into communication on alternate reciprocations of the piston, said stuffing box operative to close communication through said groove on a predetermined length of stroke of said piston in either direction.

3. In a vehicle wheel, the combination with a rim and hub, of a spoke composed of two telescoping cylinders, one of which is pivoted to the rim and the other pivoted to the hub, a floating piston disconnected from each cylinder and also from the hub and rim and having a head working in a compression chamber in one cylinder, a stuffing-box in the end of the cylinder, said piston having a rod extending through said stuffing box, means for maintaining the head normally at one end of said chamber, said piston rod having a longitudinal groove constructed and arranged to bring the interior of the chamber and outer atmosphere into communication on alternate reciprocations of the piston, and said piston having a cup leather and a piston head so constructed and arranged that the air admitted by said groove may pass the piston into said compression chamber.

4. In a vehicle wheel, the combination of two telescoping cylinders, a free, moving floating piston working in a chamber in one cylinder, said chamber closed at one end and having a stuffing box at the other end, said piston having a stem extending through the stuffing box, a cushioning support for the opposite end of the piston, within the other cylinder, said piston rod having a longitudinal port with one end of the port open to the atmosphere and the other end periodically opening into said chamber on the reciprocation of the piston, and means by which air admitted to said chamber on one side of the piston by the port is delivered into the space on the other side of the piston to be compressed on a subsequent movement of the piston.

5. In a cushioning device, a cylinder, a piston having a piston rod, said cylinder closed at the ends, said piston rod extending through one end of the cylinder and having a groove with one end terminating at a distance from the piston, but capable of being brought into communication with the interior of the cylinder when the piston moves in far enough, the space in the cylinder on the side of the piston opposite from that side adjacent to the groove of the piston rod forming a compression chamber, and means by which the air admitted through the groove entrapped in the cylinder behind the piston may pass into said compression chamber.

6. In a cushioning device, a cylinder, a piston having a piston rod, said cylinder closed at the ends, said piston rod extending through one end of the cylinder and having a groove with one end terminating at a distance from the piston, but capable of being brought into communication with the interior of the cylinder when the piston moves in far enough, the space in the cylinder on the side of the piston opposite from that side adjacent to the groove of the piston rod forming a compression chamber, and means by which the air admitted through the groove entrapped in the cylinder behind the piston may pass into said compression chamber, said last named means consisting in the construction and arrangement of the piston so that it will contract to provide an air space between it and the cylinder when moving in one direction and expand to form an air-tight sliding joint with the cylinder when the piston moves in the opposite direction.

7. In a cushioning device, the combination with a cylinder closed at one end, a piston in the cylinder having a piston rod, a stuffing box in the cylinder opposite the closed end and through which the piston rod passes, said piston rod having a longitudinal air port open at one end to the atmosphere and the other end normally out of communication with the interior of the cylinder, said piston having a contractible and expansible head to permit air to pass by it when the piston moves in one direction, and to prevent air from passing by it when it moves in the opposite direction.

8. In a cushioning device, the combination with a cylinder closed at one end, a piston in the cylinder having a piston rod, a stuffing box in the cylinder opposite the closed end and through which the piston rod passes, said piston dividing the cylinder into a compression chamber and a suction chamber, and means for admitting air into the suction chamber on the inward reciprocation of the piston, said piston having a contractible and expansible head to permit air to pass by it when the piston moves in one direction, and to prevent air from passing by it when it moves in the opposite direction.

9. In a cushioning device, the combination with a cylinder, a piston in the cylinder having an expansible and contractible head, said piston dividing the cylinder into a suction chamber and a compression chamber, and having a piston rod extending out through the suction chamber, means for admitting air into the suction chamber on the inward reciprocation of the piston, said last named means including a longitudinal valveless port in the piston rod, said port being normally out of communication with the suction chamber.

In testimony whereof I have hereunto set my hand in the presence of two subscribing witnesses.

W. M. RANK.

Witnesses:
 JOHN H. HERRING,
 CHARLES EDELMAN.

---

Copies of this patent may be obtained for five cents each, by addressing the "Commissioner of Patents, Washington, D. C."